US011077890B2

(12) United States Patent
Pan et al.

(10) Patent No.: US 11,077,890 B2
(45) Date of Patent: Aug. 3, 2021

(54) END OF TRAILER FAIRING FOR IMPROVED AERODYNAMIC PERFORMANCE

(71) Applicant: Compagnie Generale des Etablissements Michelin, Clermont-Ferrand (FR)

(72) Inventors: Chinglin Pan, Mauldin, SC (US); Calvin Rhett Bradley, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 138 days.

(21) Appl. No.: 16/488,510

(22) PCT Filed: Apr. 29, 2017

(86) PCT No.: PCT/US2017/030297
§ 371 (c)(1),
(2) Date: Aug. 23, 2019

(87) PCT Pub. No.: WO2018/200007
PCT Pub. Date: Nov. 1, 2018

(65) Prior Publication Data
US 2021/0139084 A1    May 13, 2021

(51) Int. Cl.
*B62D 35/00* (2006.01)
*B62D 37/02* (2006.01)

(52) U.S. Cl.
CPC .......... *B62D 35/001* (2013.01); *B62D 37/02* (2013.01); *B60Y 2200/145* (2013.01)

(58) Field of Classification Search
CPC . B62D 35/001; B62D 37/02; B60Y 2200/145
See application file for complete search history.

(56) References Cited

U.S. PATENT DOCUMENTS

| 3,934,922 A | 1/1976 | MacCready, Jr. et al. |
| 5,374,013 A | 12/1994 | Bassett |
| (Continued) | | |

FOREIGN PATENT DOCUMENTS

| EP | 2927103 A1 | 10/2015 |
| SU | 1268464 A1 | 11/1986 |

OTHER PUBLICATIONS

European Patent Office; International Search Report and Written Opinion for patent application PCT/US2017/030297 filed Apr. 29, 2017; Publisher: European Patent Office, Rijswijk, Netherlands; Jan. 22, 2018; pp. 1-9, enclosed.

(Continued)

*Primary Examiner* — Lori L Lyjak
(74) *Attorney, Agent, or Firm* — Neal P. Pierotti

(57) ABSTRACT

A fairing for a back end of a trailer is provided that has a leading airflow surface oriented within an angular range from 5 degrees to 14 degrees to a surface of the trailer to which the fairing is attached. The angular range is oriented so that its arms extend rearward from a vertex of the angular range in a longitudinal direction of the trailer. A tailing airflow surface is present that engages the leading airflow surface at meeting location. The tailing airflow surface is curved, and a common tangent line of the tailing airflow surface and the leading airflow surface is at the meeting location. A frame engages the surface of the trailer to which the fairing is configured to be attached.

15 Claims, 7 Drawing Sheets

(56) References Cited

U.S. PATENT DOCUMENTS

Figure 3:
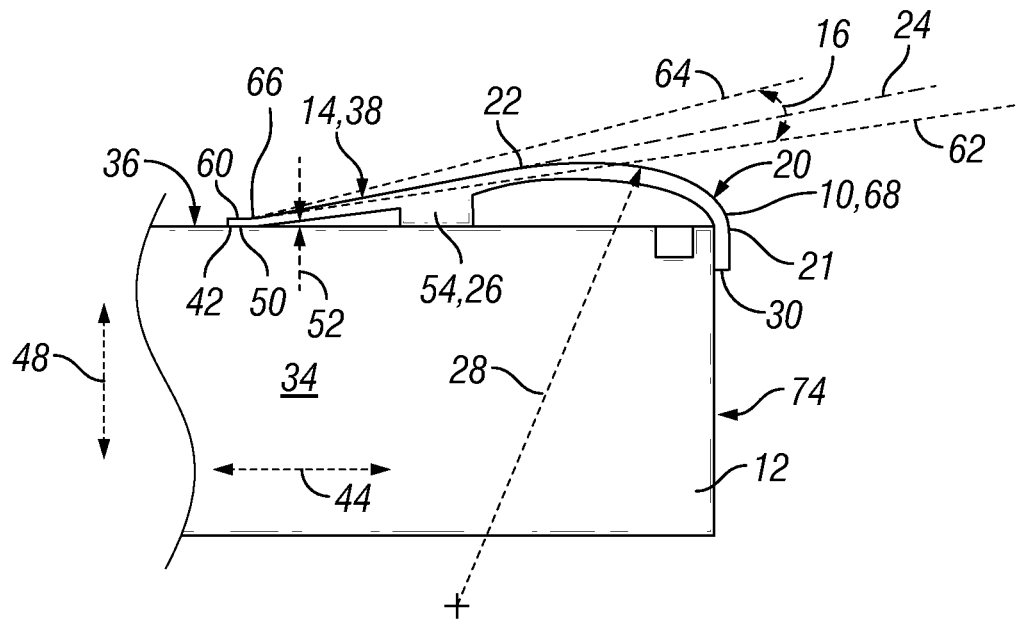

| | | |
|---|---|---|
| 7,641,262 B2 | 1/2010 | Nusbaum |
| 8,033,594 B2 | 10/2011 | Nusbaum |
| 8,196,994 B2 | 6/2012 | Chen |
| 8,251,436 B2 | 8/2012 | Henderson et al. |
| 8,684,447 B2 | 4/2014 | Henderson et al. |
| 8,770,650 B1 | 7/2014 | Brosseau |
| 8,783,757 B2 | 7/2014 | Henderson et al. |
| 9,056,636 B2 | 6/2015 | Henderson et al. |
| 9,637,184 B1 * | 5/2017 | Bennett ............... B62D 35/001 |
| 2007/0046066 A1 * | 3/2007 | Cosgrove ............. B62D 35/001 296/180.4 |
| 2008/0093886 A1 | 4/2008 | Nusbaum |
| 2011/0095564 A1 | 4/2011 | Chen |
| 2011/0115254 A1 | 5/2011 | Skopic |
| 2013/0076068 A1 | 3/2013 | Wayburn |

OTHER PUBLICATIONS

J. Ridings, Technical Service Bulletin, No. TSB-05-0007, 1 page, dated Mar. 30, 2017, SmartTruck.†
SmartTruck, "SmartTruck Aero Rain Guard Installation", 8 pages of video snippets from video, Mar. 4, 2015, accessed Dec. 18, 2019 at "https://www.youtube.com/watch?v=s6yi4KnowvU&t=79s".†
SmartTruck, "TopKit—SmartTruck", pp. 1-3, Apr. 22, 2017, accessed Dec. 18, 2019 at "https://web.archive.org/web/20161013122213/http://smarttruckaero.com/products-overview/top-kit".†

\* cited by examiner
† cited by third party

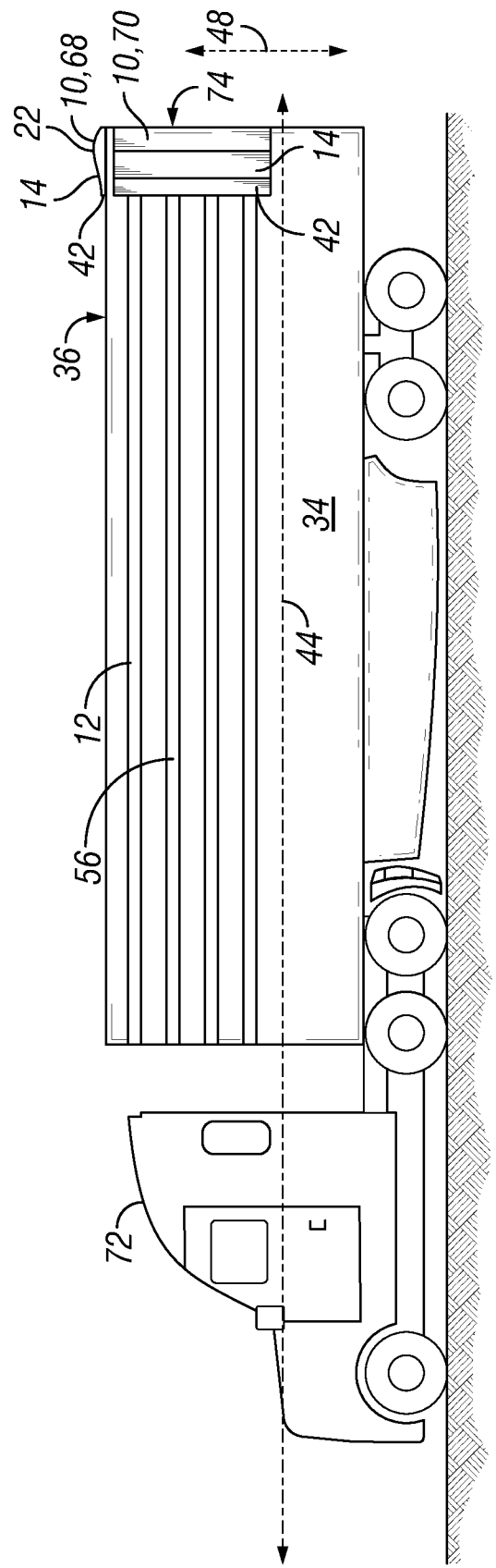
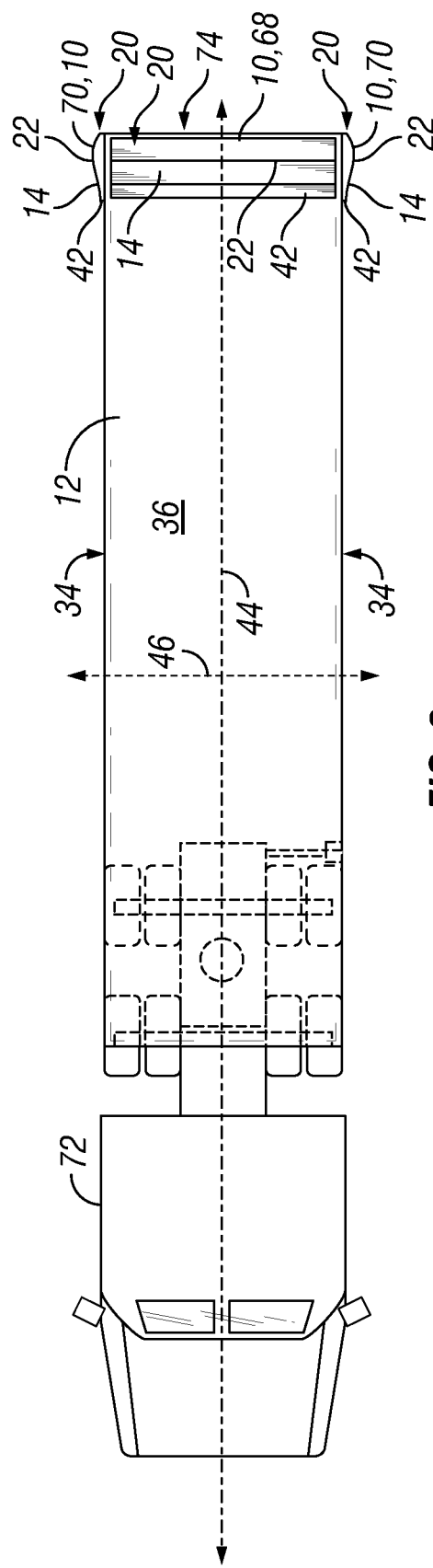

END OF TRAILER FAIRING FOR IMPROVED AERODYNAMIC PERFORMANCE

CROSS-REFERENCE TO RELATED APPLICATION

The present application is a 35 U.S.C. § 371 application of PCT/US17/30297 filed on Apr. 29, 2017 and entitled "End of Trailer Fairing for Improved Aerodynamic Performance." PCT/US17/30297 is incorporated by reference herein in its entirety for all purposes.

FIELD OF THE INVENTION

The subject matter of the present invention relates to an end of trailer fairing that improves aerodynamic performance of the trailer. More particularly, the present application involves fairing that features a specific geometric shape that includes a trailing curved portion that meets at a point of tangency with a leading portion that is flat or curved with a large radius.

BACKGROUND OF THE INVENTION

Trailers towed by trucks and similar apparatuses for transporting cargo can be large, unwieldy, and include geometries which invite inefficiencies during travel. One aspect of these inefficiencies concerns the aerodynamics of the trailer. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced and permits the trailer to be towed more efficiently, increasing the gas mileage and performance of the vehicle and its cargo. Other ways of improving aerodynamic performance of the trailer involves the provision of fairings to the end of the trailer. The fairings modify the airflow around or off of the end of the trailer to reduce drag. It is known to produce fairings that have a curved outer surface that extend from the leading edge of the fairing to the tailing edge of the fairing. These curved fairings change the airflow about the end of the trailer to reduce dragging force. Although capable of reducing some dragging force at the end of the trailer, additional fairing designs that can stabilize the airflow wake structure behind the trailer are desirable. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a truck hauling a trailer with fairings located at the rearward end of the trailer.

FIG. 2 is a top view of FIG. 1.

FIG. 3 is a side view of a back portion of a trailer with a top fairing.

FIG. 4 is a side view of a back portion of a trailer with a top fairing in accordance with a different exemplary embodiment.

FIG. 5 is a detailed side view of the front portion of the top fairing showing the anchoring flange attached to the trailer via double sided tape.

FIG. 6 is a perspective view of a back portion of the trailer with a frame of the fairing attached to the top surface of the trailer.

FIG. 7 is a top view of a back portion of the trailer with a side fairing.

FIG. 8 is a top view of a back portion of the trailer with a side fairing in accordance with a different exemplary embodiment.

FIG. 9 is a perspective view of a side fairing.

FIG. 10 is a perspective view of a back portion of a trailer with a side fairing attached.

FIG. 11 is a perspective view of a side fairing showing ribs of the frame that are received within complimentary grooves of the trailer.

FIG. 12 is a top view of a back portion of a trailer that shows a frame engaging the side surface of the trailer and the bottom of a portion of the fairing that has the tailing airflow surface.

FIG. 13 is a top view of a back portion of the trailer that shows a wedge used to help mount the tailing airflow surface to the side surface of the trailer.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a back of the trailer fairing 10 that improves aerodynamic performance of the trailer 12 to reduce drag on the trailer 12 when a truck 72 is transporting the trailer 12. The fairing 10 can be a top fairing 68 that is attached to the top surface 36 of the trailer 12, or the fairing 10 may be a side fairing 70 attached to the side surface 34 of the trailer 12. In some instances, the trailer 12 can be provided with side fairings 70 on both of its sides 34, and with a top fairing 68 on its top surface 36. The fairing 10 features a leading airflow surface 14 that is either flat or has a radius that is very large, for example greater than 2000 millimeters. The leading airflow surface 14 meets a tailing airflow surface 20 at a meeting location 22, and a common tangent line 24 extends through the meeting location 22 and is tangent to both the leading airflow surface 14 and the tailing airflow surface 20 at this point. Air will travel over the leading airflow surface 14 and the tailing airflow surface 20 to result in an optimal reduction of drag on the trailer 12 during transport.

FIGS. 1 and 2 illustrate a truck 72 transporting a trailer 12 that features back of the trailer fairings 10 in accordance with one exemplary embodiment. The truck 72 and trailer 12 combination extends in a longitudinal direction 44 of the trailer 12 which is the general direction of travel as the truck 72 pulls the trailer 12 forward. The fairings 10 direct airflow in an optimal manner around the back of the trailer 12 so that drag on the trailer 12 during travel is optimally reduced. The geometric design of the fairing 10 includes features that result in this optimal reduction of drag. Although three fairings 10 are shown at the back end of the trailer 12, it is to be understood that the trailer 12 may be outfitted with only one or with two of the fairings 10 in other exemplary embodiments. The fairings 10 are located proximate to the terminal end 74 of the trailer 12 and are attached to the trailer 12 and are forward of the terminal end 74 in the longitudinal direction 44. In some instances the fairings 10 extend rearward of the terminal end 74 in the longitudinal direction 44. The fairings 10 are located at the back end of the trailer 12 because they are designed to effect the flow of air at the back end of the trailer 12 and behind the trailer 12 during travel. Additional fairings can be employed at the bottom of the trailer 12 or in other locations on the trailer 12 as desired.

As shown in FIG. 1, the side fairing 70 extends in a vertical direction 48 of the trailer 12 along some, but not all, of the vertical height of the trailer 12. The side fairing 70 is located closer to the top surface 36 of the trailer 12 than a bottom surface of the trailer 12. The side fairing 70 may be located at the top surface 36, or it may be spaced some distance from the top surface 36 in the vertical direction 48. The side fairing 70 is mounted to the side surface 34 of the trailer 12. In some instances, the side surface 34 can include grooves 56 that extend in the horizontal direction/longitudinal direction 44. The side fairing 70 may be provided with ribs 54 that are disposed within these grooves 56 in order to allow the side fairing 70 to fit on the side surface 34.

With reference to FIG. 2, the top faring 68 is likewise located at the back end of the trailer 12 so that it is closer to the back terminal end 74 of the trailer 12 than to the front terminal end of the trailer 12. The top fairing 68 may be spaced some amount forward of the back terminal end 74 in the longitudinal direction 44, may terminate right at the back terminal end 74, or may extend rearward from the back terminal end 74 in the longitudinal direction 44. The top fairing 68 may extend all the way across the top surface 36 in the lateral direction 46 of the trailer 12 so as to be located at both the right and left side surfaces 34. Alternatively, the top fairing 68 may be spaced inboard from one or both of the side surfaces 34. The right and left side fairings 70 can be identical in configuration to one another, or may have different geographical shapes or include different members, such as mounting members.

FIG. 3 is a side view of the back end of the trailer 12 with the top fairing 68 positioned onto the top surface 36 of the trailer 12. The top fairing 68 has a leading airflow surface 14 that is forward of a tailing airflow surface 20 in the longitudinal direction 44. The top fairing 68 may be made of a single component or any number of components. The leading airflow surface 14 and the tailing airflow surface 20 may be just the surfaces of one or more portions of the top fairing 68, or may include in addition to the surfaces some thickness or portion or the rest of the top fairing 68. As such, it is to be understood that as used herein that the leading airflow surface 14 and the tailing airflow surface 20 includes the surface of some of the fairing 10, concerning both the top fairing 68 and the side fairing 70, and may include some thickness or other portion of the fairing 10 in addition to the surface. It is to be understood that as used herein, when discussing the orientation of the surfaces 14, 20 with respect to angles, radii, locations, ranges, etc. the portion of the surfaces 14, 20 that are being measured or discussed are the outer surfaces of the leading airflow surface 14 and the tailing airflow surface 20 and not interior portions, if any, of these surfaces 14, 20. The surfaces 14, 20 can be made of plastic and may be formed through a thermal plastic forming process.

The leading airflow surface 14 has a leading edge 60 that is the forward most portion of the leading airflow surface 14 in the longitudinal direction 44. Forward of the leading edge 60 is an anchoring flange 42, but in other embodiments, for example as shown in the FIG. 4 embodiment, the leading edge 60 is the forward most portion of the entire top fairing 68. The leading airflow surface 14 can be oriented within an angular range 16 that is from 8-14 degrees. The angular range 16 is oriented rearward in the longitudinal direction 44. The angular range 16 includes a vertex 66 that is located at the leading edge 60. An arm 62 extends from the vertex 66 rearward in the longitudinal direction 44, and another arm 64 likewise extends from the vertex 66 rearward in the longitudinal direction 44 so that the arms 64, 66 and the vertex 66 bound the angular range 16. The angle of the angular range 16 is measured relative to the top surface 36. In this regard, an angle of 0 degrees is parallel to the top surface 36, and an angle of the angular range 16 that is 180 degrees is normal to the top surface 36.

The leading airflow surface 14 is positioned so that all of it is located within the angular range 16. In this regard, the angular range 16 is from 8 degrees to 14 degrees so that it is from 8 degrees to 14 degrees angled with respect to the top surface 36. The preferred orientation of the leading airflow surface 14 is from 11 degrees to 13 degrees. In the embodiment shown, the leading airflow surface 14 is 12 degrees. The leading airflow surface 14 is a flat surface that lies in a plane 38. It is therefore the case that the angular orientation of the leading airflow surface 14 does not change along its entire length in the longitudinal direction 44, and the entire leading airflow surface 14 is located within the angular range 16.

The leading airflow surface 14 ends at a meeting location 22 where it meets the tailing airflow surface 20. The tailing airflow surface 20 need not be completely located within the angular range 16. The tailing airflow surface 20 may be partially located within the angular range 16. The tailing airflow surface 20 is a curved surface that extends from the meeting location 22 to a tailing airflow surface terminal end 21. A flange of the top fairing 68 extends from the tailing airflow surface terminal end 21 to a terminal tailing end 30. The tailing airflow surface terminal end 21 is at the terminal end 74 or is forward of the terminal end 74 in the longitudinal direction 44. In other instances, the tailing airflow surface 20 extends to a terminal tailing end 30 of the fairing 10 and a flange as previously mentioned is not present. In the embodiment shown, the tailing airflow surface 20 is curved at a set amount so that the entire tailing airflow surface 20 has but a single radius 28. The radius 28 is in the range from 500 millimeters to 900 millimeters. In more preferred embodiments, the radius 28 is from 800 millimeters to 900 millimeters.

The leading airflow surface 14 and the tailing airflow surface 20 are oriented with respect to one another so that they share a common tangent line 24. The common tangent line 24 lies in the plane 38 that the flat leading airflow surface 14 also lies. The common tangent line 24 is also a tangent line to the tailing airflow surface 20 at the meeting location 22. It is therefore the case that the leading airflow surface 14 and the tailing airflow surface 20 both share a common tangent line 24 at the meeting location 22 between the leading airflow surface 14 and the tailing airflow surface 20. The meeting location 22 is the point of engagement between the leading airflow surface 14 and the tailing airflow surface 20 and in so far as the common tangent line 24 is common to both of these surfaces 14, 20 it is to be understood that both the leading airflow surface 14 and the tailing airflow surface 20 simultaneously exist at the meeting location 22. In this regard, since both surfaces 14, 20 exist at the meeting location 22, the common tangent line 24 is common to both the leading airflow surface 14 and the tailing airflow surface 20 so that these two surfaces 14, 20 share a common tangent line 24 at this meeting location 22. This arrangement affords airflow off of the leading airflow surface 14 to channel against the tailing airflow surface 20 with no disruption. The orientation of the leading airflow surface 14, and the size of the radius 28 and the common tangent line 24 results in a geometry of the top fairing 68 that causes air flow to travel over the top fairing 68 and around the rear of the trailer 12 to reduce dragging force while the truck 72 is hauling the trailer 12 to improve its fuel efficiency.

The leading air flow surface 14 is spaced from the top surface 36 so that a gap 52 is present and the portions of the top fairing 68 that are below or carry the leading air flow surface 14 are not in engagement with the top surface 36. The anchoring flange 42 is attached to the top surface 36 and may engage the top surface 36. The top fairing 68 has a frame 26 engages the top surface 36 and can be present to help reinforce the portions of the top fairing 68 that include the leading airflow surface 14 and the tailing airflow surface 20. The frame 26 is located below the leading air flow surface 14 in the vertical direction 48 and is not located below the tailing airflow surface 20. The frame 26 can be a separate component from the leading air flow surface 14 or may be simply a lower section of the leading air flow surface 14 and integrally formed with the leading air flow surface 14. The tailing airflow surface 20 is spaced from the top surface 36 from the meeting location 22 to the tailing airflow surface terminal end 21 at which point it may engage the top surface 36. The tailing air flow surface 20 could cover a rain gutter of the top surface 36 and does not extend beyond the terminal end 74 of the trailer 12.

It is to be understood that the frame 26 can be a component that is separate from the leading airflow surface 14 and the tailing airflow surface 20, or may be integrally formed with these surfaces 14, 20 and made of the same or different material than the surfaces 14, 20. The frame 26 may extend across and engage both of the surfaces 14, 20. If the surfaces 14, 20 include thickness and not just the outer surfaces that are measured, the frame 26 may still be present and the frame 26 could be part of these thicknesses even if the frame 26 is integrally formed with the surfaces 14, 20.

Figure 4:
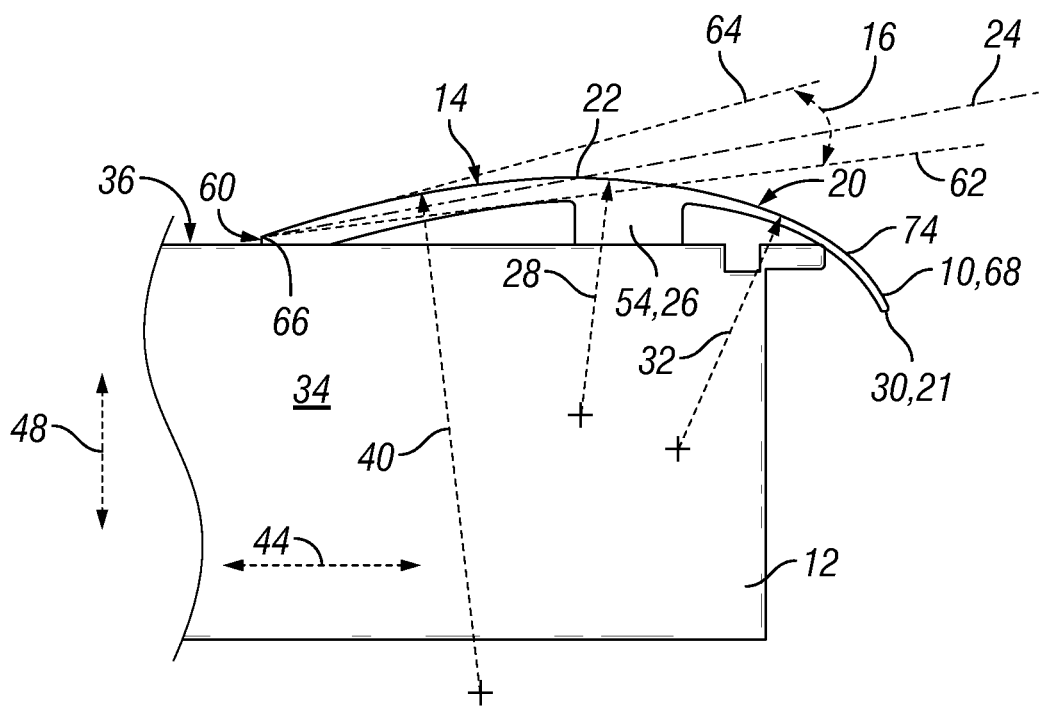

Another embodiment of the top fairing 68 is shown with reference to FIG. 4. The leading airflow surface 14 is different in that it is not a flat surface in a single plane 38, but is instead a curved surface. The flat leading airflow surface 14 is replaced by a curved surface with a leading airflow surface radius 40. The leading airflow surface radius 40 is larger than 2000 millimeters. Although curved, the leading airflow surface 14 is completely located within the angular range 16, that as previously stated is from 8 degrees to 14 degrees. The tailing airflow surface 20 is not a single curved surface with a single radius 28, but is instead a pair of curved surfaces in which each have their own radius. The first curved surface has a radius 28, and the second curved surface of the tailing airflow surface 20 has a different radius of 32. Although a pair of curved surfaces are present, all of the radii of the curved surface of the tailing airflow surface 20 are each in the range of 500 millimeters to 900 millimeters. If multiple additional curved surfaces are present in the tailing airflow surface 20, their radii will likewise be in the range from 500 millimeters to 900 millimeters.

The meeting location 22 occurs between the leading airflow surface 14 and the curved surface of the tailing airflow surface 20 that has the radius 28. The leading airflow surface 14 and the tailing airflow surface 20 are both curved and share a common tangent line 24 at the meeting location 22. The vertex 66 is located at the terminal end that is the forward most location of the top fairing 68. The leading airflow surface 14 engages the top surface 36. The top fairing 68 also includes a frame 26 that is rearward of the meeting location 22 in the longitudinal direction 44 and is located only under the tailing airflow surface 20. The frame 26 can be arranged as previously discussed and a repeat of this information is not necessary. The tailing airflow surface 20 contacts the terminal end 74 and extends beyond the terminal end 74 and is rearward of the trailer 12 in the longitudinal direction 44. In other embodiments, the tailing airflow surface 20 may not engage the terminal end 74. The various elements of the top fairing 68 can be modified or arranged in the manners previously discussed with reference to the top fairing 68 in FIG. 3 and a repeat of this information is not necessary. The top fairing 68 with the modifications noted in FIG. 4 allows for airflow to be directed over the trailer 12 to reduce drag and increase aerodynamic performance.

Figure 5:
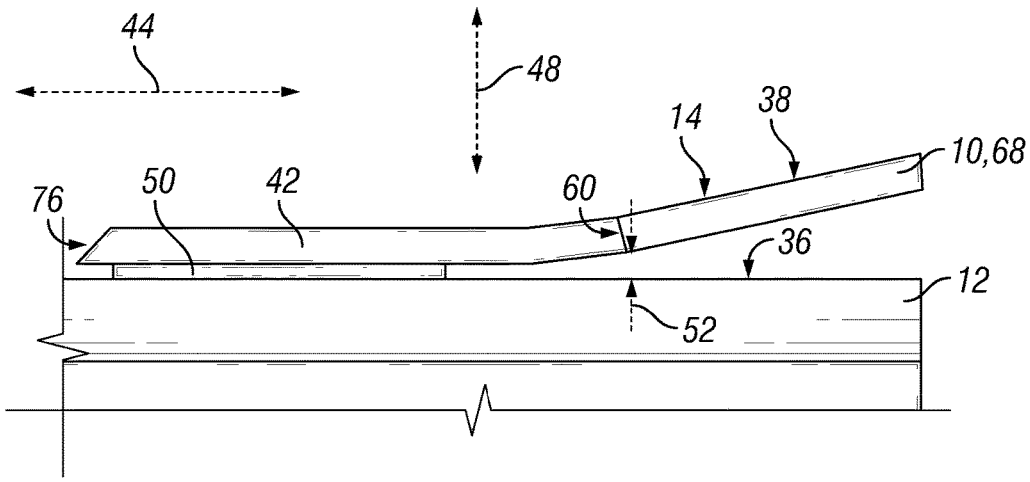

FIG. 5 is a detailed view of the front portion of the top fairing 68 in accordance with certain exemplary embodiments. The top fairing 68 has an anchoring flange 42 that is attached to the top surface 36 with double sided tape 50 that engages the bottom of the anchoring flange 42 and the top surface 36. The double sided tape 50 extends in the longitudinal direction 44 an amount that is less than the length of the anchoring flange 42 in the longitudinal direction 44. The double sided tape 50 can be spaced rearward from the forward most leading edge of the anchoring flange 42 in the longitudinal direction 44 so that a space is present under the anchoring flange 42 forward of the double sided tape 50 in the longitudinal direction 44. The anchoring flange 42 has a chamfer 76 located at is forward most end in the longitudinal direction 44 that functions to reduce the profile of the anchoring flange 42 and direct air flow over the anchoring flange 42 in a more streamlined fashion. The chamfer 76 may be provided at an angle that is in the range from 15 degrees to 60 degrees. The chamfer 76 may be formed by machining the end of the anchoring flange 42. The leading airflow surface 14 engages anchoring flange 42 at the leading edge 60. The double sided tape 50 spaces the leading airflow surface 14 from the upper surface 36 so that a gap 52 exists between the upper surface 36 and the leading edge 60. The gap 52 is a space at this location in which the leading edge 60 does not engage the upper surface 36. The entire leading airflow surface 14 can likewise be spaced from and free from engagement with the upper surface 36 along its length, or just a portion of the leading airflow surface 14 can be free from engagement with the upper surface 36 extending rearward from the leading edge 60 in the longitudinal direction 44. The entire anchoring flange 42 is free from engagement with the top surface 36, but it may engage the top surface 36 in certain exemplary embodiments. The double sided tape 50 secures the anchoring flange 42 to the top surface 36 and may be between the anchoring flange 42 and the top surface 36 to prevent their engagement.

Figure 6:
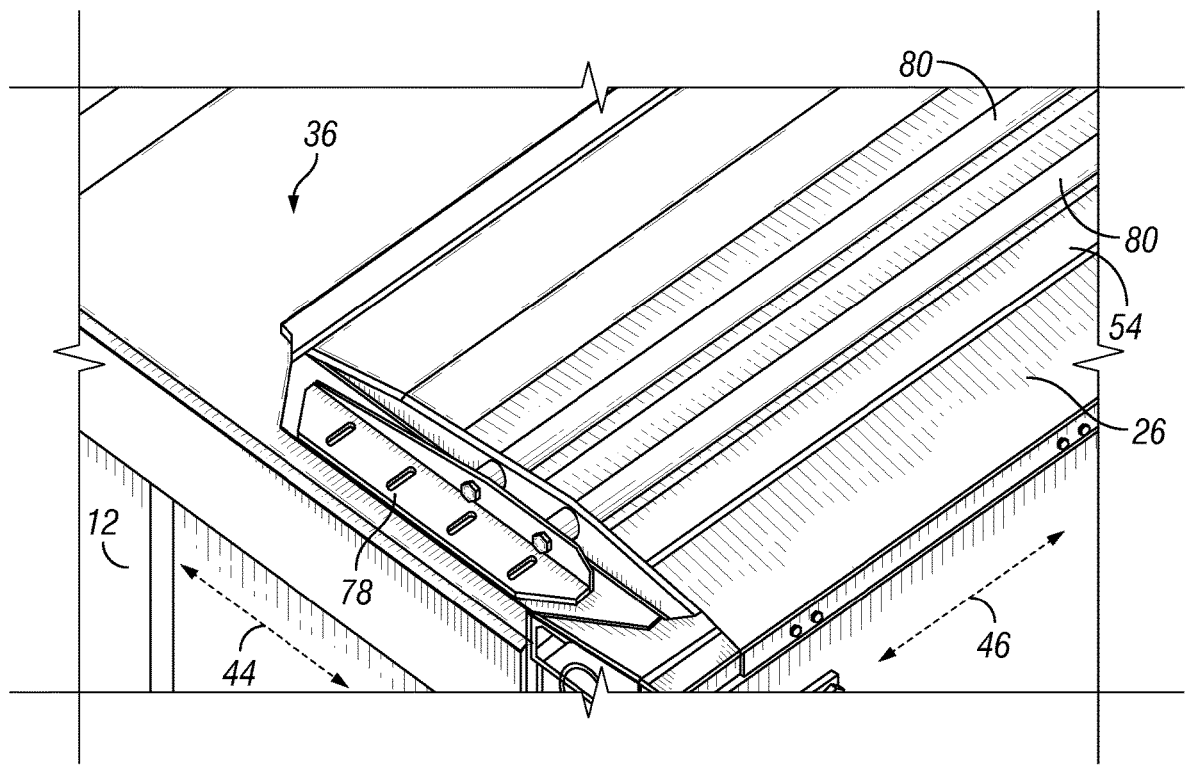

The frame 26 is shown attached to the top surface 36 with reference to FIG. 6. The trailer 12 includes brackets 78 at the top of the trailer 12 on opposite sides in the lateral direction 46. The frame 26 may be located under the bracket 78 so as to be between the bracket 78 and the top surface 36. One or more bars 80 extend between and to both of the brackets 78 in the lateral direction 46. The bars 80 may go through holes of the frame 26 secure the frame 26 to the top surface 36, or may be positioned on top of or otherwise engage the frame 26 to secure the frame 26 to the top surface 36. The use of bars 80 may allow the frame 26, and consequently the leading airflow surface 14 and the tailing airflow surface 20 to be attached to the trailer 12 without having to drill holes through the top surface 36 which could results in rain or contaminants entering the interior of the trailer 12. In this manner, the interior of the trailer 12 is made more secure by the use of the brackets 78 and the bars 80 to retain the top fairing 68 to the trailer 12. Although described as utilizing the bars 80 to secure the top fairing 68, the bars 80 are not used in other embodiments. In these instances, the frame 26 has flanges that are positioned under the brackets 78 and the brackets 78 are tightened down onto these flanges of the frame 26 to secure the frame 26 to the top surface 36. Additional securement by the double sided tape 50 will also aid in securing the top fairing 68 to the top surface 36.

Figure 7:
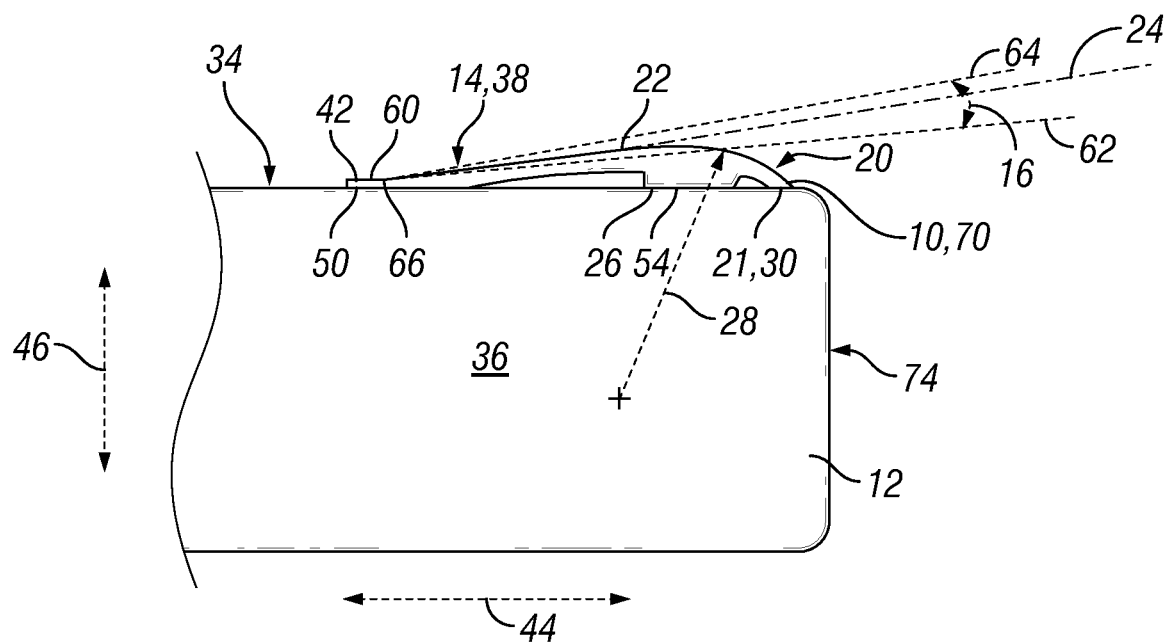

Another embodiment of the fairing 10 is illustrated in FIG. 7 in which the fairing 10 is a side fairing 70. The variously described embodiments and variations as previously discussed with respect to the top fairing 68 are applicable as well to the side fairing 70 and a repeat of this information is not necessary. The side fairing 70 functions to direct the flow of air around the side of the trailer 12 and to an area behind the trailer to result in less drag on the trailer 12 when the truck 72 is transporting the trailer 12. Although a second side fairing 70 is not shown at the opposite side of the trailer 12 in the lateral direction 46 in FIG. 7, it is to be understood that such a second side fairing 70 is present in other embodiments. The side fairing 70 again has an anchoring flange 42 attached to the side surface 34, and a leading airflow surface 14 that follows the anchoring flange 42 in the longitudinal direction 44, and a tailing airflow surface 20 that follows the leading airflow surface 14 in the longitudinal direction 44. The anchoring flange 42 may include the chamfer 76 in some embodiments, and it may be provided at an angle from 15 degrees to 60 degrees to enhance the aerodynamic properties of the side fairing 70.

The leading airflow surface 14 is again a flat surface that lies in a plane 38 and is completely contained from its leading edge 60 to the meeting location 22 within the angular range 16. The angular range 16 of the leading airflow surface 14 has a maximum range of degrees that are different than that as previously described with respect to the angular range 16 of the leading airflow surface 14 of the top surface 36. In this regard, the angular range 16 of the side fairing 70 is from 5 degrees to 9 degrees. Again, the angular range 16 is measured with respect to the side surface 34 such that 0 degrees is parallel to the side surface 34, 5 degrees is at a 5 degree angle to the side surface 34, 9 degrees is at a 9 degree angle to the side surface 34, and so on. The orientation of the angular range 16 is rearward in the longitudinal direction 44 in that the arms 62, 64 of the angular range 16 extend rearward in the longitudinal direction 44 from the vertex 66. In more preferred embodiments, the angular range 16 is from 6.2 degrees to 8.2 degrees. In a preferred embodiment, the angular range 16 is 7.2 degrees.

The entire leading airflow surface 14 is located within the angular range 16, and the leading airflow surface 14 has a common tangent line 24 with the tailing airflow surface 20 at the meeting location 22. The tailing airflow surface 20 is a single curved surface with a single radius 28. The tailing airflow surface terminal end 21 is located at the terminal tailing end 30 of the fairing 10 and is forward of the terminal end 74 in the longitudinal direction 44. The side surface 34 may translate to the terminal end 74 by way of a radius or curved corner, and the tailing airflow surface terminal end 21 and the terminal tailing end 30 may both be forward of this radius or curved corner in the longitudinal direction 44. The tailing airflow surface 20 has a radius 28 that is from 550 millimeters to 1050 millimeters. In more preferred embodiments, the radius 28 is from 884 millimeters to 984 millimeters. In a preferred embodiment, the radius 28 is 934 millimeters. Selection of a radius 28 within the listed ranges/distance provides airflow around the side fairing 70 to reduce drag, and this selection coupled with the tangency at the meeting location 22 along with the angle of the leading airflow surface 14 provides beneficial aerodynamic properties to the side fairing 70.

The frame 26 engages the side surface 34 and is located below the tailing airflow surface 20 and is not below the leading airflow surface 14. The frame 26 is spaced along the underside of the tailing airflow surface 20 so as to be spaced from both the meeting location 22 and the terminal tailing end 30 in the longitudinal direction 44. A gap 52 can be present to space the leading airflow surface 14 from the side surface 34 so that these surfaces 14, 34 do not engage one another.

Figure 8:
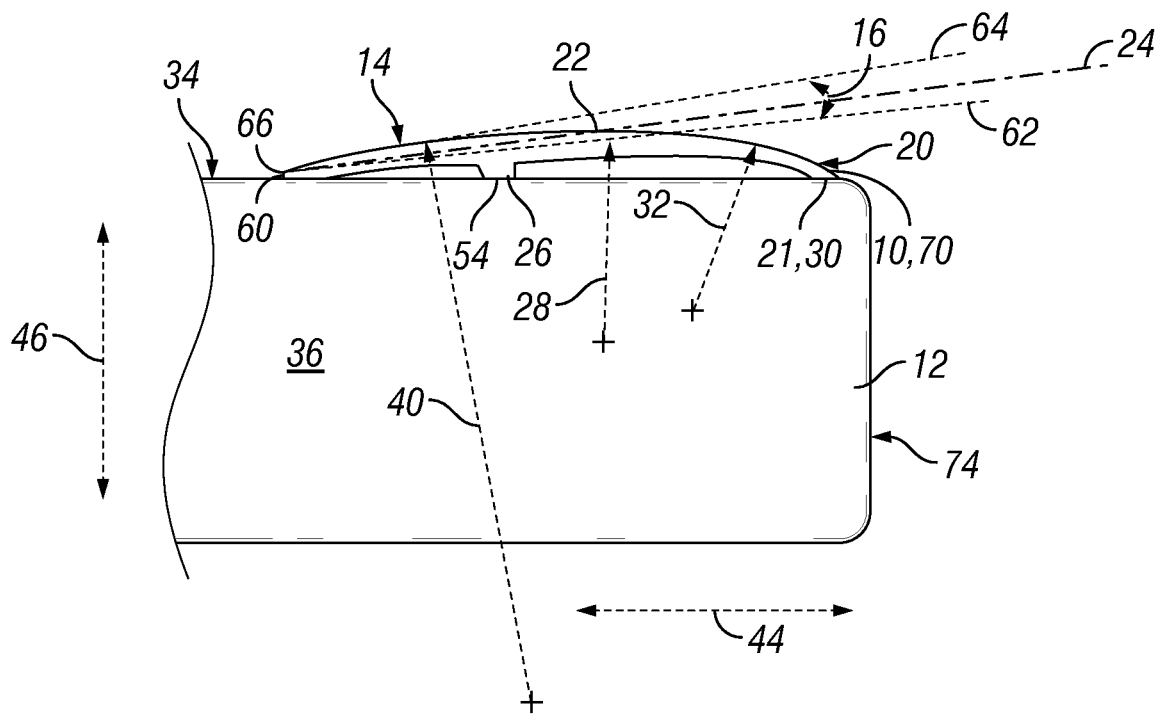

The side fairing 70 is shown in another embodiment with reference to FIG. 8. Again, the side fairing 70 may be configured the same as in other exemplary embodiments and a repeat of this information is not necessary. The side fairing 70 lacks an anchoring flange 42 and the leading edge 60 forms the terminal forward end of the side fairing 70 in the longitudinal direction 44. The vertex 66 is located at the leading edge 60, and the angular range 16 is against from 5 degrees to 9 degrees for the side fairing 70 with a preferred range of 6.2 degrees to 8.2 degrees. The entire leading airflow surface 14 is within the angular range 16, and the leading airflow surface 14 is not flat but is instead curved with a leading airflow surface radius 40 that is larger than 2000 millimeters. The tailing airflow surface 20 is made up of multiple curved surfaces with their own radius. However, all of the radii of the curved surfaces making up the tailing airflow surface are from 550 millimeters to 1050 millimeters. This range is for individual radii and not for the addition of all of the radii such that each one of the radii 28, 32 are by itself within this range. The tailing airflow surface 20 terminates at the side surface 34 and the terminal tailing end 30 and the tailing airflow surface terminal end 21 are coincident. These ends 21, 30 are forward of the terminal end 74 in the longitudinal direction 44 and are forward of rounded corners that transition the trailer 12 from the side surface 34 to the terminal end 74 in the longitudinal direction 44.

The curved leading airflow surface 14 and the portion of the tailing airflow surface 20 at the meeting location 22 both have a common tangent line 24. Again, both surfaces 14 and 20 are considered to exist at the meeting location 22 and they are tangent to one another at this point. This tangency helps to direct the flow of air across the side fairing 70 at this location. The side fairing 70 also has a frame 26 that engages the side surface 34 and is inboard of most of the leading airflow surface 14 in the lateral direction 46 and is between and spaced from both the meeting location 22 and the leading edge 60 in the longitudinal direction 44. Although not shown on the left side 34 of the trailer 12, an additional side fairing 70 could be included and arranged in a similar manner as the one illustrated in FIG. 8.

Figure 9:
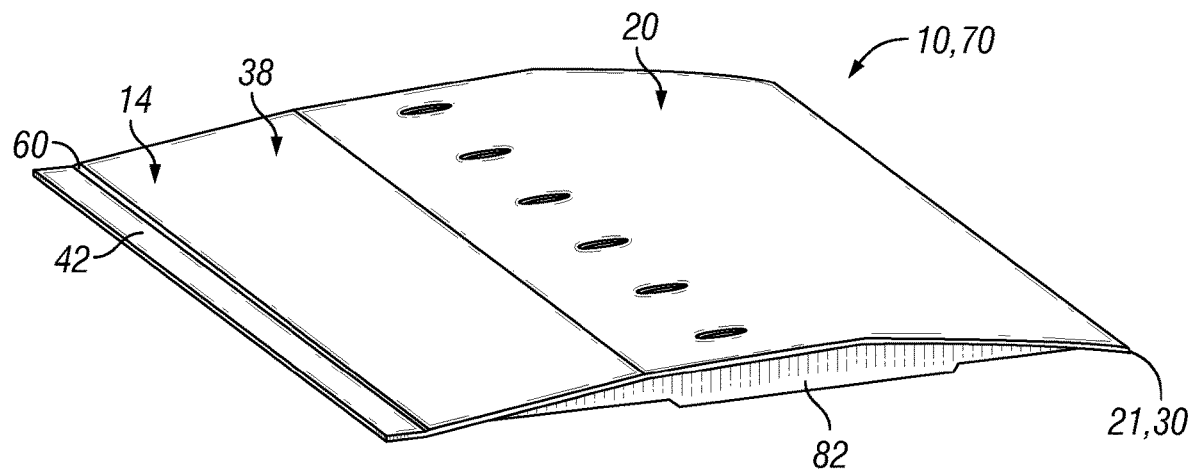

FIG. 9 is a perspective view of the side fairing 70 in which an anchoring flange 42 is present and the leading airflow surface 14 is flat and lays in a plane 38. The tailing airflow surface 20 is curved and a flange is located at the end of the side fairing 70 with the terminal tailing end 30 at the flange. The side fairing 70 can be attached to the side surface 34 through the use of bolts that extend through the leading airflow surface 14 or the tailing airflow surface 20 and into the side surface 34. The bolts may likewise extend through a frame 26 of the side fairing 70 in some arrangements. The top and/or bottom of the side fairing 70 in the vertical direction 48 can be provided with a sidewall 82 that functions to close the interior of the side fairing 70 and that may act to direct airflow around the side fairing 70 or prevent disruption of airflow at the side fairing 70 to prevent drag. Although shown with the sidewall 82, it is to be understood that the sidewall 82 need not be present in other exemplary embodiments of the side fairing 70. Further, the sidewall 82 may likewise be present in embodiments of the top fairing 68. The sidewalls 82 may also function to prevent deformation of the fairing 10.

Figure 10:
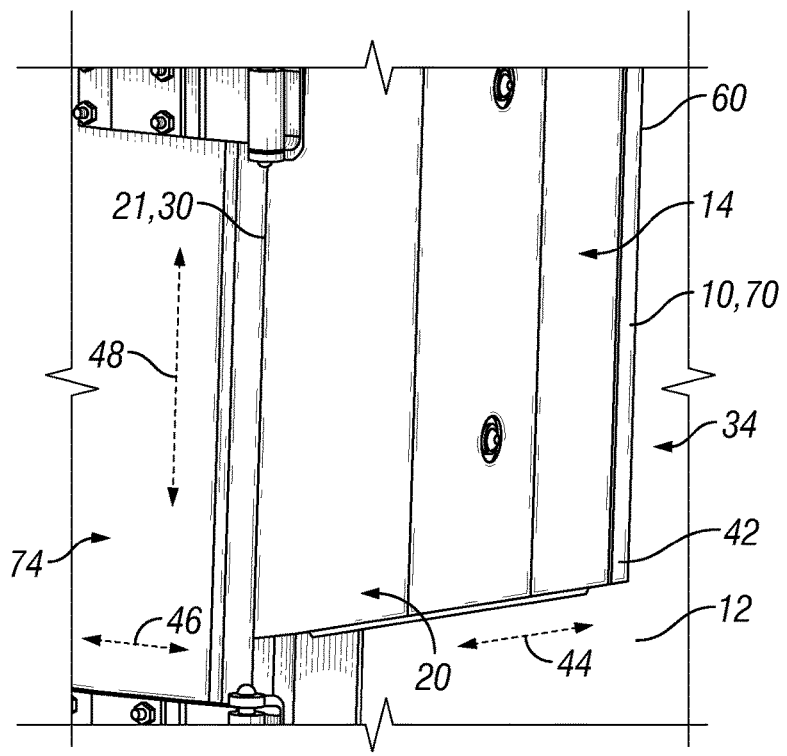

FIG. 10 shows the side fairing 70 attached to the side surface 34 via bolts into the side surface 34. The side fairing 70 is configured relative to the back door of the trailer 12 so that the back door may be opened and closed without interference with the side fairing 70. The tailing airflow surface 20 blends into the side surface 34 so there is a smooth transition of air flow between these members.

Figure 11:
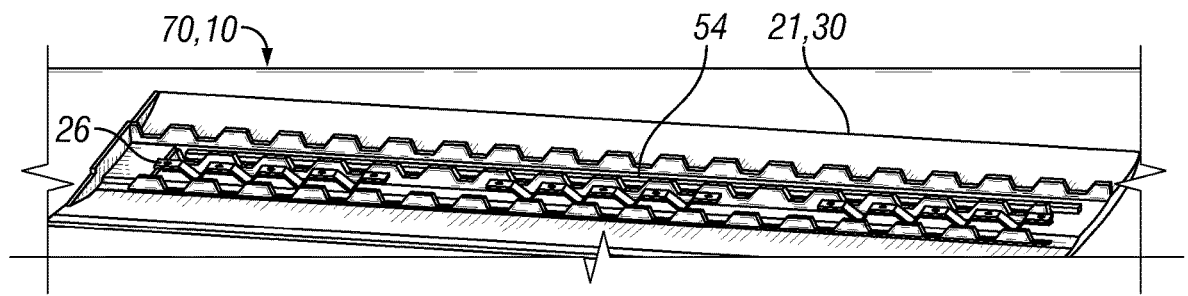

FIG. 11 shows the side fairing 70 in which the frame 26 is provided with a series of ribs 54 that are provided in order to be located within complimentary grooves 56 of the trailer 12. The ribs 54 may be of any size or shape and are located at different spots on the frame 26 to allow the side fairing 70 to be compatible with different trailers 12. The ribs 54 may still be present even when the side fairing 70 is used with trailers 12 that do not have grooves 56. In this regard, the side fairing 70 can be produced with ribs 54 and is compatible with trailers 12 with and without grooves 56 so that manufacturing benefits can be realized. The ribs 54 allow the side fairing 70 to be common with both flat side surfaces 34 and those that have grooves 56.

Figure 12:
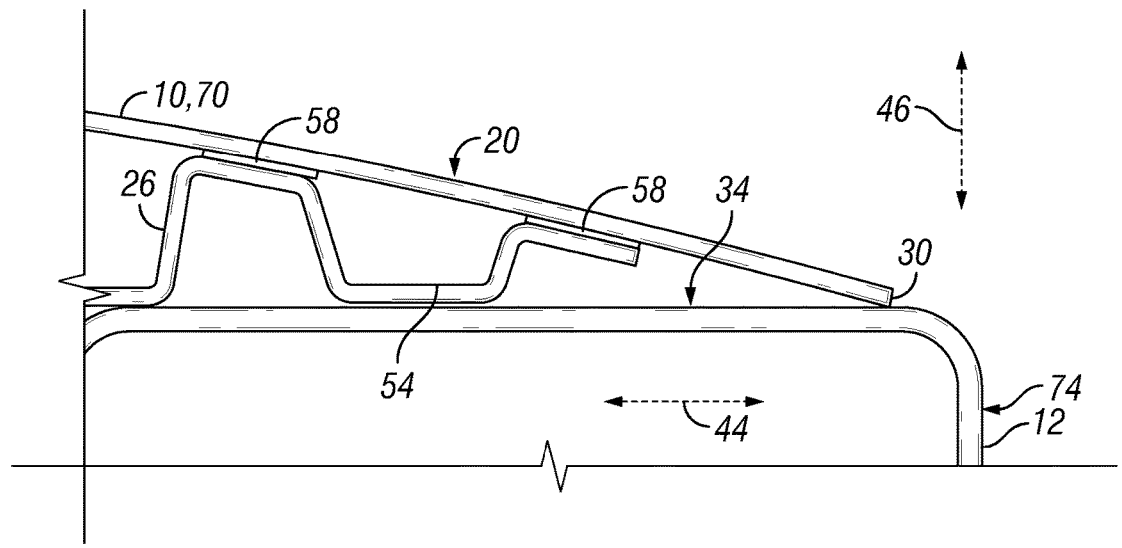

FIG. 12 is a top view of a back portion of the trailer 12 in which the side fairing 70 is attached to the side surface 34. The frame 26 includes a series of ribs 54 and the frame 26 may be attached to the side surface 34 via bolts or adhesive. The frame 26 can be made of steel in some arrangements, or may be made of lighter weight materials as desired. The frame 26 is attached to the tailing airflow surface 20 by double sided tape 58 that engages both the tailing airflow surface 20 and the frame 26. Multiple strips of the double sided tape 58 can be present. The double sided tape 58 may not engage the ribs 54. The terminal tailing end 30 engages the side surface 34 but does not extend all the way to the terminal end 74 in the longitudinal direction 44 so that the terminal tailing end 30 is forward from the terminal end 74 in the longitudinal direction 44. The terminal tailing end 30 may engage the side surface 34 before the disclosed bend in the side surface 34 that transitions to the back surface which is the terminal end 74. The terminal tailing end 30 is thus forward in the longitudinal direction 44 from this bend.

Figure 13:
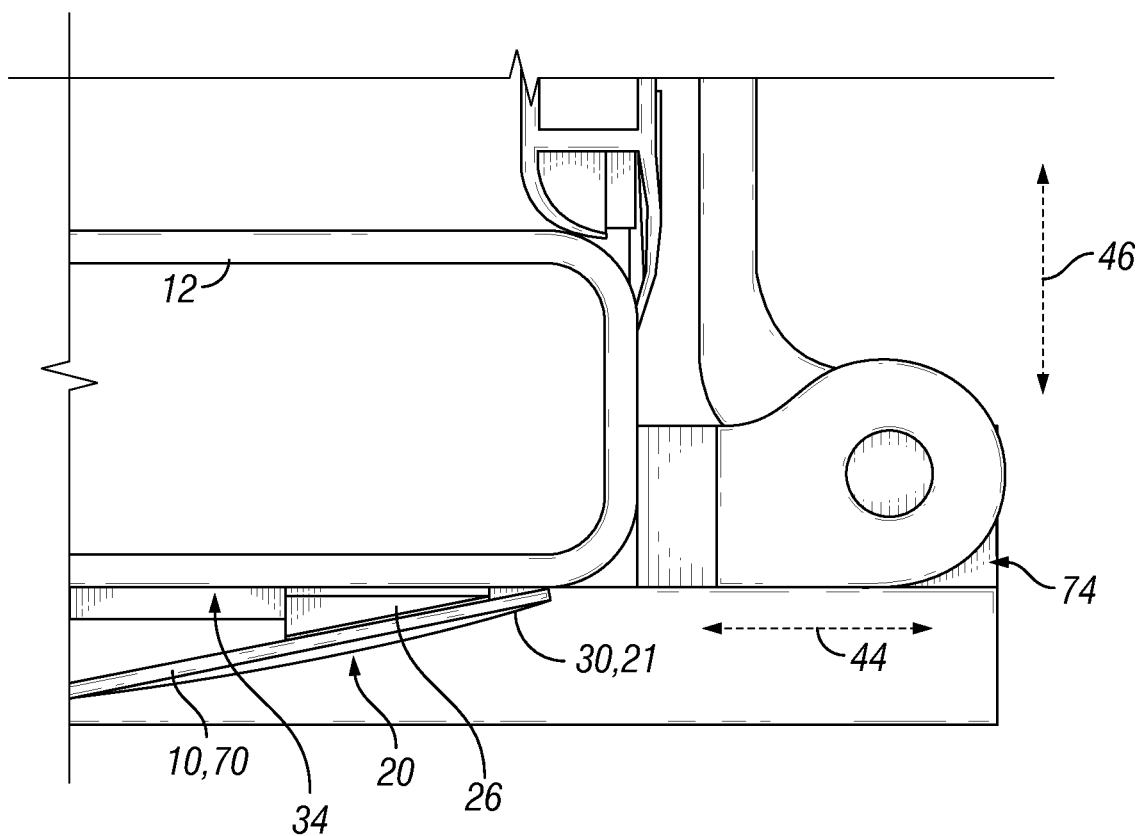

The frame 26 can be made of multiple sections that are contiguous with one another or that are spaced from one another and not in contact with one another. FIG. 13 shows a portion of the frame 26 that is wedge shaped and is located proximate to the terminal tailing end 30 of the side fairing 70. Additional sections of the frame 26 could be present at other portions of the side fairing 70 free from engagement with the wedge section, or the wedge section illustrated may be the only portion of the frame 26 in the side fairing 70. The wedge section of the frame 26 is attached to the side surface 34 and the tailing airflow surface 20 by double sided tape, or through a different attachment mechanism in other exemplary embodiments. The wedge section of the frame 26 functions to support the tailing airflow surface 20 and to hold this portion of the side fairing 70 to the side surface 34 at this location. The terminal tailing end 30 of the side fairing 70 terminates forward of the terminal end 74 in the longitudinal direction 44. The terminal tailing end 30 and the coincident tailing airflow surface terminal end 21 are shown as engaging the trailer 12 forward of a bend in the trailer at the end of the side surface 34 and forward of the terminal end 74 in the longitudinal direction 44. In other versions, the ends 21, 30 may engage this bend, or may be free from engagement with this bend, or be rearward of the terminal end 74 in the longitudinal direction 44.

The design of the top fairing 68 and the side faring 70 differ in that their angular ranges and their radii are different in magnitude from one another. As such, the fairing 10 disclosed may a leading airflow surface 14 with an angular range that is from 5 degrees to 14 degrees. The fairing 10 may have a curved tailing airflow surface 20 with a radius 28 that is in the range from 500 millimeters to 1050 millimeters. In this regard, should the tailing airflow surface 20 be constructed of multiple curved surfaces with each having its own radius, each of the radii would be in that disclosed range from 500 millimeters to 1050 millimeters.

Embodiments of the fairing 10 exist in which the fairing 10, regardless of whether the fairing 10 is the top fairing 68 or the side fairing 70, is located at or forward from the terminal end 74 in the longitudinal direction 44 when the fairing 10 is attached to the trailer 10. In this regard, although the fairing 10 may be right at the terminal end 74 in the longitudinal direction 44, no portion of the fairing 10 is located rearward of the terminal end 74 in the longitudinal direction 44. Still further, embodiments exist in which the fairing 10 is spaced some distance from the terminal end 74 forward in the longitudinal direction 44, and no portion of the fairing 10 is rearward to the terminal end 74 in the longitudinal direction 44.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A fairing for a back end of a trailer, comprising:
   a leading airflow surface that is configured to be oriented within an angular range from 5 degrees to 9 degrees to a surface of the trailer to which the fairing is configured to be attached, wherein the surface to which the fairing is configured to be attached is a side surface of the trailer;
   wherein the angular range is oriented with respect to the surface of the trailer to which the fairing is configured to be attached such that arms of the angular range are located rearward from a vertex of the angular range in a longitudinal direction of the trailer;
   a tailing airflow surface that engages the leading airflow surface at meeting location, wherein the tailing airflow surface is curved, wherein a common tangent line of the tailing airflow surface and the leading airflow surface is at the meeting location; and
   a frame that is configured to engage the surface of the trailer to which the fairing is configured to be attached.

2. The fairing as set forth in claim 1, wherein the tailing airflow surface has a constant radius from the meeting location to a tailing airflow surface terminal end such that the entire tailing airflow surface has a single radius.

3. The fairing as set forth in claim 1, wherein the tailing airflow surface has different radii from the meeting location to a tailing airflow surface terminal end.

4. The fairing as set forth in claim 1, wherein the angular range is from 6.2 degrees to 8.2 degrees.

5. The fairing as set forth in claim 3, wherein the radii are each from 550 millimeters to 1050 millimeters.

6. The fairing as set forth in claim 5, wherein the radii are each from 884 millimeters to 984 millimeters.

7. The fairing as set forth in claim 1, wherein the leading airflow surface is flat, wherein the flat leading airflow surface lies in a plane of the leading airflow surface, and wherein the common tangent line of the tailing airflow surface and the leading airflow surface at the meeting location lies in the plane of the leading airflow surface.

8. The fairing as set forth in claim 1, wherein the leading airflow surface is curved and has a leading airflow surface radius, wherein the leading airflow surface radius is larger than 2000 millimeters.

9. The fairing as set forth in claim 1, further comprising:
an anchoring flange that engages the leading airflow surface at a leading edge of the leading airflow surface, wherein the anchoring flange is forward of the leading edge of the leading airflow surface in a longitudinal direction of the trailer;
double sided tape that engages the anchoring flange and is configured for engaging the surface of the trailer to which the fairing is configured to be attached, wherein a gap is formed between a leading edge of the leading airflow surface and the surface of the trailer to which the fairing is configured to be attached such that the leading edge of the leading airflow surface does not engage the surface of the trailer to which the fairing is configured to be attached.

10. The fairing as set forth in claim 1, wherein a terminal tailing end of the fairing is configured to be located at or forward from a terminal end of the trailer in the longitudinal direction of the trailer such that no portion of the fairing is configured to be located rearward to the terminal end of the trailer in the longitudinal direction of the trailer.

11. A fairing for a back end of a trailer, comprising:
a leading airflow surface that is configured to be oriented within an angular range from 8 degrees to 14 degrees to a surface of the trailer to which the fairing is configured to be attached, wherein the surface to which the fairing is configured to be attached is a top surface of the trailer;
wherein the angular range is oriented with respect to the surface of the trailer to which the fairing is configured to be attached such that arms of the angular range are located rearward from a vertex of the angular range in a longitudinal direction of the trailer;
a tailing airflow surface that engages the leading airflow surface at meeting location, wherein the tailing airflow surface is curved, wherein a common tangent line of the tailing airflow surface and the leading airflow surface is at the meeting location; and
a frame that is configured to engage the surface of the trailer to which the fairing is configured to be attached.

12. The faring as set forth in claim 11, wherein the angular range is from 11 degrees to 13 degrees.

13. The fairing as set forth in claim 11, wherein the tailing airflow surface has different radii from the meeting location to a tailing airflow surface terminal end, where the radii are each from 500 millimeters to 900 millimeters.

14. The fairing as set forth in claim 13, wherein the radii are each from 800 millimeters to 900 millimeters.

15. A fairing for a back end of a trailer, comprising:
a leading airflow surface that is configured to be oriented within an angular range from 5 degrees to 14 degrees to a surface of the trailer to which the fairing is configured to be attached;
wherein the angular range is oriented with respect to the surface of the trailer to which the fairing is configured to be attached such that arms of the angular range are located rearward from a vertex of the angular range in a longitudinal direction of the trailer;
a tailing airflow surface that engages the leading airflow surface at meeting location, wherein the tailing airflow surface is curved, wherein a common tangent line of the tailing airflow surface and the leading airflow surface is at the meeting location; and
a frame that is configured to engage the surface of the trailer to which the fairing is configured to be attached;
wherein the leading airflow surface is flat, wherein the flat leading airflow surface lies in a plane of the leading airflow surface, and wherein the common tangent line of the tailing airflow surface and the leading airflow surface at the meeting location lies in the plane of the leading airflow surface.

* * * * *